(12) United States Patent
Malcus et al.

(10) Patent No.: US 8,663,507 B2
(45) Date of Patent: Mar. 4, 2014

(54) PULVERULENT COMPOUNDS, PROCESSES FOR THE PREPARATION THEREOF AND THE USE THEREOF IN ELECTROCHEMICAL APPLICATIONS

(75) Inventors: Stefan Malcus, Goslar (DE); Armin Olbrich, Seesen (DE); Juliane Messe-Marktscheffel, Goslar (DE); Matthias Jahn, Goslar (DE)

(73) Assignee: Toda Kogyo Europe GmbH, Dusseldorf (DE)

( * ) Notice: Subject to any disclaimer, the term of this patent is extended or adjusted under 35 U.S.C. 154(b) by 662 days.

(21) Appl. No.: 12/373,948

(22) PCT Filed: Oct. 11, 2007

(86) PCT No.: PCT/EP2007/008849
§ 371 (c)(1),
(2), (4) Date: Nov. 10, 2009

(87) PCT Pub. No.: WO2008/043559
PCT Pub. Date: Apr. 17, 2008

(65) Prior Publication Data
US 2010/0102282 A1    Apr. 29, 2010

(30) Foreign Application Priority Data
Oct. 13, 2006 (DE) .......... 10 2006 049 107

(51) Int. Cl.
*H01B 1/02* (2006.01)
*H01B 1/00* (2006.01)
*H01B 1/12* (2006.01)
*C01B 13/14* (2006.01)

(52) U.S. Cl.
USPC .......... 252/519.14; 252/182.1; 252/500; 422/225; 423/592.1; 423/594.19; 429/223

(58) Field of Classification Search
USPC .......... 252/182.1, 519.14, 500; 422/225; 423/592, 592.1, 593, 594, 594.19; 429/223
See application file for complete search history.

(56) References Cited

U.S. PATENT DOCUMENTS

| 5,478,535 A | 12/1995 | Fierz et al. |
| 5,498,403 A | 3/1996 | Shin |
| 2002/0053663 A1 | 5/2002 | Ito et al. |
| 2005/0220700 A1 | 10/2005 | Suhara et al. |
| 2005/0221179 A1* | 10/2005 | Baeuerlein et al. .......... 429/223 |

FOREIGN PATENT DOCUMENTS

| EP | 0 648 784 | 4/1995 |
| EP | 0 901 812 | 3/1999 |
| GB | 1 518 229 | 7/1978 |
| GB | 2 237 943 | 2/1999 |
| GB | 2 327 943 A * | 2/1999 | .......... C01G 53/04 |
| JP | 2002-304992 | 10/2002 |
| WO | WO 2004/032260 | 4/2004 |

OTHER PUBLICATIONS

International Search Report for PCT/EP2007/008849 mailed Feb. 5, 2008.

* cited by examiner

*Primary Examiner* — Bijan Ahvazi
(74) *Attorney, Agent, or Firm* — Nixon & Vanderhye P.C.

(57) ABSTRACT

The present invention relates to pulverulent compounds of the formula $Ni_bM1_cM2_d(O)_x(OH)_y(SO_4)_z$, a process for the preparation thereof and the use thereof as precursors for the preparation of active materials for lithium secondary batteries.

15 Claims, 3 Drawing Sheets

Figure 1:
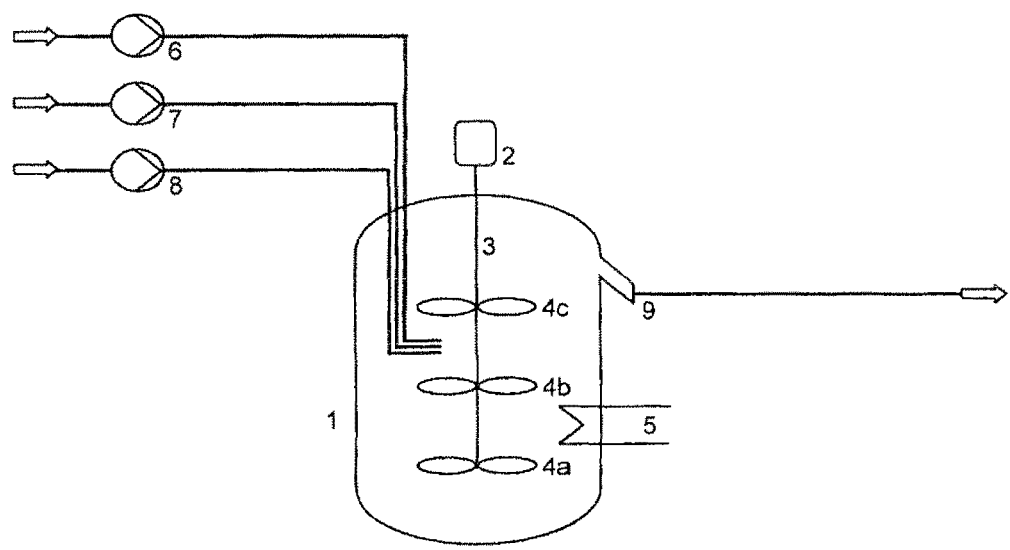

PULVERULENT COMPOUNDS, PROCESSES FOR THE PREPARATION THEREOF AND THE USE THEREOF IN ELECTROCHEMICAL APPLICATIONS

This application is the U.S. national phase of International Application No. PCT/EP2007/008849 filed 11 Oct. 2007 which designated the U.S. and claims priority to German Patent Application No. 10 2006 049 107.6 filed 13 Oct. 2006, the entire contents of each of which are hereby incorporated by reference.

The present invention relates to pulverulent compounds of the formula $Ni_bM1_cM2_d(O)_x(OH)_y(SO_4)_z$, a process for the preparation thereof and the use thereof as a precursor for electrochemical applications.

A multiplicity of different doped or coated nickel compounds has been investigated and synthesized for a very long time in order to use them either as active material for NiMH batteries or as a precursor for a very wide range of lithium mixed metal oxides. Examples of such compounds are coprecipitated hydroxides, such as an $Ni_{0.50}Co_{0.20}Mn_{0.30}(OH)_2$, described in US 2002/0053663 A1, or an $NiCo(OH)_2$ coated with $Al(OH)_3$, as described in EP1637503A1.

The lithium mixed metal oxides synthesized from the nickel-containing precursor serve, in addition to the lithium cobalt oxide already in use for a relatively long time, as active cathode material for lithium ion secondary batteries. Under this very high energy density, this type of secondary battery currently dominates the battery market with regard to mobile electronic devices, such as mobile phones, laptops or digital cameras.

Example compounds of such lithium mixed metal oxides are $LiNi_{0.80}Co_{0.15}Al_{0.05}O_2$ or $LiNi_{0.33}Co_{0.33}Mn_{0.32}O_2$. Coprecipitated as well as coated nickel compounds are particularly suitable as precursors for the lithium mixed metal oxides, since a homogeneous distribution of the individual elements can be achieved as early as the stage of the precursor. Homogeneous distribution of all metallic elements of the end product is of very great importance for the product properties in the battery.

At the required, high energy density of the storage media (NiMH batteries as well as lithium ion secondary batteries), a distinction may be made between the volumetric energy density, expressed in watt hours/liter (Wh/l), and the gravimetric energy density, expressed in Wh/kg. The volumetric energy density of the secondary battery is influenced, inter alia, by the electrode density ($g/cm^3$) both on the side of the cathode and on the side of the anode. The higher the electrode density of the cathode or anode, the higher is the volumetric energy density of the storage medium. The electrode density in turn is influenced both by the production process of the electrode and by the active cathode material used. The higher the density of the cathode material (for example, determined as tapped density or as compressed density), the higher is the resulting electrode density under otherwise constant conditions during electrode manufacture (e.g. process for electrode manufacture, electrode composition). This discovery is already reflected in some documents. For the density of the lithium mixed metal oxides as cathode material for lithium secondary batteries, the density of the corresponding precursor (e.g. a coprecipitated $Ni(OH)_2$ or a coated $Ni(OH)_2$) also plays an important role.

Since a certain pressure is applied during the electrode preparation, the tapped density or compacted density determined for the powder need not necessarily, however, permit direct conclusions about the electrode density with the use of this powder. The compressed density of a powder, determined under a defined pressure, is a variable which permits more reliable conclusions about an electrode density with this powder. A precondition of the abovementioned measurement of the compressed density as well as for the electrode manufacture should be that the particles do not break during the compression. Breaking of the particle would firstly mean uncontrolled manufacture of the electrode and furthermore such breaking of the particle would lead to inhomogeneities. Thus, the internal fracture surfaces of the broken particle would not have such good contact with the binder and the conductive additive of the electrode as the outer surface of the particles. US 2004/0023113 A1 is concerned with the determination of the compressed density and compressive strength of cathode powders.

Substances of the general formula $Li_xM(1-y)N_2O_2$ are mentioned therein as active cathode material for lithium secondary cells, where $0.2 \leq x \leq 1.2$ and $0 \leq y \leq 0.7$. Here, M is a transition metal and N is a transition metal differing from M, or an alkaline earth metal. In US 2004/0023113 A1, particular value is placed on the fact that the particle size distribution must have a defined form in order for the compression flow through the particle bed during the compression for electrode manufacture to be particularly gentle, and that the density of the electrode can also be optimized thereby. In addition to the particle size distribution, it is also mentioned that the particles of the powder should have pores which are as small as possible, and the pore volume of the pores up to a diameter of 1 µm should not exceed a value of 0.03 $cm^3/g$ (measured by Hg porosimetry). However, no particular process engineering measures are described for achieving said product parameters. In the determination of the compressed density, the powder is pressed under a pressure of 0.3 $t/cm^2$.

In the examples, mainly lithium cobalt oxides are described. At the abovementioned compression pressure of 0.3 $t/cm^2$, compressed densities in the range of 2.58-3.32 $g/cm^3$ are reached.

In addition to the compressed density itself, value is furthermore placed on the fact that, after compression of the material, the volume fraction of the particles smaller than 1 µm is not greater than 0.1%. A significant increase in the fine particles after the compression would indicate that particles are destroyed during the application of pressure. Such a phenomenon would endanger the homogeneity of the electrode.

However, it is to be assumed that a pressure of 0.3 $t/cm^2$ does not correspond to the pressures which are actually applied during the electrode manufacture. During the electrode manufacture, the material must be capable of withstanding at least a pressure of 1 $t/cm^2$. In JP 2001-80920 A a pressure of 2 $t/cm^2$ is stated in Example 1 for the electrode manufacture.

JP 2001-80920 A mentions the compressive strength of lithium mixed metal oxides (LNCO) which contain three metallic components in relation to lithium and can likewise be used as active materials for lithium secondary batteries.

The materials thus manufactured have a compressive strength of 0.001-0.01 N. According to this document, it is desirable for the particles to disintegrate into their primary constituents during the electrode manufacture, which is contrary to the argumentation of US 2004/0023113 A1. According to JP 2001-80920 A, the material which has disintegrated into smaller constituents must have a certain flowability in order for the particles to be able to become uniformly distributed on the electrode.

US 2005/0220700 A1 likewise discusses the compressive strength of lithium mixed metal oxides. There, the compounds have the formula $Li_pNi_xCO_yMn_zM_qO_{2-a}F_a$. While only a value of 0.3 $t/cm^2$ is stated for the compressive strength in US 2004/0023113 A1, compressive strengths of at least 50 MPa, which corresponds to 0.5 t/cm², are stated in US 2005/0220700 A1 for the lithium mixed metal compounds. However, the formula for the relevant compounds in US 2005/0220700 A1 is substantially more narrowly defined than that in US 2004/0023113 A1. Thus, manganese is a fixed constituent of all compounds in US 2005/0220700 A1. US 2005/0220700 A1 does not go into any detail as to why the compounds mentioned have a particular compressive strength. Only a defined particle size range and a defined range for the specific surface area of the materials are mentioned. No process engineering peculiarities which make the material particularly pressure-resistant are mentioned.

It is evident that the properties of the nickel-containing precursor for LNCO synthesis will also influence the compressive strength of the end product. It is to be assumed that a more pressure-resistant precursor also gives a more pressure-resistant end product. Parameters in the precursor, such as, for example, the porosity or the external shape of the particles, play a major role and also subsequently influence the compressive strength of the end product.

However, the documents mentioned provide no information about the compressive strength of the nickel-containing precursors for LNCO synthesis.

As already mentioned, both doped and coated nickel hydroxides are used not only as a precursor for LNCO synthesis but also directly as active material for NiMH batteries. In this application, too, a certain compressive strength is required.

The document JP 2002-304992 mentions the compressive strength of nickel hydroxides which are used as active material in secondary alkaline batteries. A primary aim of the document is to prepare a nickel hydroxide having improved performance data and improved high-temperature properties. Within the scope of this object, it was found that the internal structure of the particles, and hence also the compressive strength of the particles, influence the performance data and the high-temperature properties of the nickel hydroxide. According to the document, the high internal, radial order of the particles is necessary in order to be able to achieve good performance characteristics. This internal, radial order just mentioned is associated with a low compressive strength. Thus, according to the present document, the maximum compressive strength, measured on the individual particle using an MCTM-200 apparatus from Shimadzu, of not more than 40 MPa is desirable for the nickel hydroxides.

It is an object of the present invention to provide nickel-containing compounds as a precursor for electrochemical applications, in which the secondary particles are not broken or not comminuted during the further processing. Preservation of the secondary particles during the further processing is of great importance for the subsequent product homogeneity. At the same time, high electrode densities and good electrochemical properties in the end product should be achieved with such a nickel-containing precursor. It is furthermore the object of the present invention to provide a process for the preparation of a nickel-containing precursor.

The object is achieved by a pulverulent compound of the formula $Ni_bM1\,\mu M2_d(O)_x(OH)_y(SO_4)_z$ (subsequently also referred to as NMOS, nickel hydroxide or mixed hydroxide), M1 denoting at least one element selected from the group consisting of Fe, Co, Cr, Mg, Cu and/or mixtures thereof, and/or M2 denoting at least one element selected from the group consisting of Mn, Al, B, Ca, Sr, Ba, Si, Zn and/or mixtures thereof and $0.3 \leq b \leq 0.94$, $0.02 \leq c \leq 0.5$, $0 \leq d \leq 0.5$ and $0.01 \leq x \leq 0.9$, $1.1 \leq y \leq 1.99$ and $0.001 \leq z \leq 0.03$, which is characterized in that the secondary particles thereof have a compressive strength of at least 50 MPa.

The secondary particles of the pulverulent NMOS compound preferably have a compressive strength of at least 100 MPa, particularly preferably at least 150 MPa. Compounds which are part of the invention are shown in Table 1.

TABLE 1

| Compound | b | M1 | c | M2 | d | x | y | z |
|---|---|---|---|---|---|---|---|---|
| 1 | 0.333 | Co | 0.333 | Mn | 0.333 | 0.80 | 1.16 | 0.018 |
| 2 | 0.50 | Co | 0.20 | Mn | 0.30 | 0.75 | 1.22 | 0.015 |
| 3 | 0.77 | Co | 0.13 | Mn | 0.10 | 0.15 | 1.83 | 0.009 |
| 4 | 0.80 | Co + Mg | 0.10 | Mn | 0.10 | 0.11 | 1.88 | 0.007 |
| 5 | 0.70 | Co | 0.10 | Mn + Zn | 0.20 | 0.16 | 1.83 | 0.006 |
| 6 | 0.30 | Co | 0.30 | Mn + Zn | 0.40 | 0.65 | 1.32 | 0.015 |
| 7 | 0.80 | Co | 0.17 | Al | 0.03 | 0.02 | 1.97 | 0.005 |
| 8 | 0.75 | Co + Fe | 0.20 | Al | 0.05 | 0.03 | 1.96 | 0.006 |
| 9 | 0.93 | Co | 0.02 | Zn | 0.05 | 0.01 | 1.98 | 0.003 |
| 10 | 0.94 | Co | 0.02 | Zn | 0.04 | 0.01 | 1.99 | 0.002 |
| 11 | 0.60 | Mg | 0.10 | Mn | 0.30 | 0.10 | 1.89 | 0.004 |
| 12 | 0.45 | Mg | 0.10 | Mn | 0.45 | 0.20 | 1.78 | 0.009 |
| 13 | 0.333 | Co | 0.333 | Mn | 0.333 | 0.55 | 1.43 | 0.012 |
| 14 | 0.45 | Co | 0.10 | Mn | 0.45 | 0.50 | 1.48 | 0.009 |
| 15 | 0.40 | Co + Mg | 0.20 | Mn | 0.40 | 0.35 | 1.64 | 0.007 |
| 16 | 0.95 | Co | 0.02 | Zn | 0.03 | 0.01 | 1.98 | 0.003 |
| 17 | 0.60 | Co | 0.20 | Mn | 0.20 | 0.12 | 1.87 | 0.005 |
| 18 | 0.91 | Co | 0.02 | Zn | 0.07 | 0.02 | 1.97 | 0.004 |
| 19 | 0.92 | Co | 0.04 | Zn | 0.04 | 0.02 | 1.98 | 0.002 |
| 20 | 0.80 | Co | 0.16 | Al | 0.04 | 0.01 | 1.99 | 0.001 |
| 21 | 0.98 | Co | 0.024 | | | 0.01 | 1.98 | 0.003 |
| 22 | 0.91 | Co | 0.09 | | | 0.04 | 1.95 | 0.004 |
| 23 | 0.86 | Co | 0.14 | | | 0.06 | 1.92 | 0.003 |
| 24 | 0.81 | Co | 0.19 | | | 0.01 | 1.98 | 0.007 |

Secondary particles are understood as meaning compact particles which are composed of a multiplicity of primary particles which are readily visible in scanning electron micrographs. The particles may have any desired shape. The particles preferably have a spheroidal shape. Primary particles are particles which have formed from nuclei during a crystallization process.

The compressive strength of the secondary particles according to the invention can be determined by the method mentioned in US 2004/0023113 A1, page 6, Example 1.

The pulverulent nickel hydroxides according to the invention are distinguished by their very low porosity. According to the invention, the pulverulent nickel hydroxides have a porosity of up to 0.05 cm³/g, preferably up to 0.04 cm³/g, particularly preferably up to 0.03 cm³/g. The porosity is determined according to ASTM D 4222.

The pulverulent nickel hydroxides according to the invention may be prepared both in spheroidal and in regular (non-spheroidal particle shape).

The preferred powders according to the invention are distinguished in particular by the spheroidal particle shape of the secondary particles, the shape factor of which has a value greater than 0.8, particularly preferably greater than 0.9.

The shape factor of the secondary particles can be determined by the method mentioned in U.S. Pat. No. 5,476,530, columns 7 and 8 and FIG. 5. This method determines a shape factor of the particle which is a measure of the sphericity of the particles. The shape factor of the secondary particle can also be determined from the scanning electron micrographs of the materials.

The shape factor is determined by evaluating the particle circumference and the particle area and determining the diameter derived from the respective size. The stated diameters are obtained from $$d_U = U/\pi \quad d_A = (4A/\pi)^{1/2}$$

The shape factor of the particles f is derived from the particle circumference U and the particle area A according to:

$$f = \left(\frac{d_A}{d_U}\right)^2 = \left(\frac{4\pi A}{U^2}\right).$$

In the case of an ideal spherical particle, $d_A$ and $d_U$ are of equal magnitude, and a shape factor of exactly one would result.

Preferably, the pulverulent nickel hydroxides according to the invention have a D10 value, measured according to ASTM B 822, which changes by not more than 0.5 preferably by not more than 1.0 compared with the starting powder after compression of the powders at a pressure of 50 MPa. The change in the D10 value as a result of the powder compression is considered to be an indicator for the assessment of the compressive strength of the pulverulent compound according to the invention after compression.

A decrease in the D10 value after the compression means that a fraction of the particle was broken into smaller particles. Thus, the change in the D10 value is a quantitative measure for determining the compressive strength of the powders according to the invention.

The pulverulent nickel hydroxides according to the invention have a normalized width of the particle distribution, measured according to the formula (I)

$$\frac{D90 - D10}{D50} \tag{1}$$

in which D denotes diameters of the secondary particles, of less than 1.4, particularly preferably of less than 1.2.

The pulverulent lithium mixed metal oxides according to the invention preferably have a compressed density of at least 2.4 g/cm$^3$.

The pulverulent nickel hydroxides according to the invention are also distinguished by the fact that they have a tapped density of at least 2.0 g/cm$^3$, particularly preferably of at least 2.3 g/cm$^3$, measured according to ASTM B527.

The invention furthermore relates to a novel process for the preparation of pulverulent metal hydroxides comprising the following steps:
a. provision of starting material solutions,
b. metering of starting material solutions from step a) into a reactor,
c. reaction of the starting material solutions in a highly turbulent reaction zone of the reactor in which the flows produced by the stirrer strike one another frontally,
d. discharge of the product suspension from the reactor via a free overflow,
e. filtration, washing and drying of the material.

Metal hydroxides from the group consisting of the metals such as Al, Ti, Zr, Hf, Fe, Co, Ni, Zn, Cu and Ag can be prepared by the process according to the invention. The starting materials used are starting material solutions of water-soluble salts of mineral acids, e.g. sulphuric acid, hydrochloric acid or nitric acid, with the abovementioned metals and/or mixtures thereof. The starting material solutions can be prepared by dissolving the relevant metal chlorides, metal solvates or metal nitrates in water or dissolving the metals in the corresponding mineral acids. The alkali solutions are provided in the desired concentration as an aqueous solution.

The process is preferably suitable for the preparation of nickel hydroxides according to the invention. Water-soluble metal salts, e.g. nickel sulphate, nickel nitrate, nickel halides, such as, for example chlorides or fluorides, and/or mixtures thereof can be used as precursors.

The preparation of the nickel hydroxides according to the invention is preferably carried out in a reactor (1) shown in FIG. 1, by precipitation crystallization from aqueous nickel salt solutions at a pH of 8-14, preferably of 9-13, by feeding in alkali metal hydroxide solutions and optionally ammonia, in gaseous form or as an aqueous solution. Preferably used alkali metal hydroxide solutions are sodium hydroxide and potassium hydroxide. Although the precipitation crystallization can be effected batchwise or semicontinuously, it is preferably carried out continuously. In the continuous process, metal salt solution, alkali metal hydroxide solution and ammonia solution are fed simultaneously to the reactor and the product suspension is taken up continuously via a free overflow or a pump.

Both the metering of starting material solutions and the production and maintenance of a highly turbulent reaction zone of the reactor play a very important role in the process according to the invention. For thoroughly mixing the starting material solutions and achieving a homogeneous suspension, the reactor is equipped with a stirrer (2) with variable speed.

A peculiarity of the reactor used in the process according to the invention is that three propellers (4a), (4b) and (4c) are arranged in various planes on a common centrally mounted stirrer shaft (3). It is possible to use multiblade propellers. However, the three-blade propellers are preferred. It was found that the properties of the products are dependent on the introduction point of the starting material solutions in the reactor, the distance between the propeller planes and the angle of attack of the propeller blades. Pressure-resistant and dense nickel hydroxides according to the invention can be prepared if the feed of the starting material solutions, subsequently also referred to as feed solutions, is effected in a zone between 2 propellers which produce the flows meeting one another. It was found that particularly pressure-resistant and dense nickel hydroxide can be very uniformly prepared in a continuously operated reactor if the feed solutions are fed in-between the middle and upper propeller and, in the case of a propeller rotating in the mathematically positive sense (to the left) when viewed from above, the angle of attack of the blades of the propeller relative to the horizontal stirrer plane of the upper and lower propeller is 30 to 60°, preferably 40 to 60°, particularly preferably 45 to 55°, and the angle of attack of the blades of the metal propeller is 120 to 150°, preferably 130 to 150°, particularly preferably 135 to 145°. In this configuration, the upper and lower propellers produce a downward flow and the middle propeller an upward flow. The feeding of the feed solutions between the upper and middle propeller thus takes place in a zone of particularly high turbulence, since 2 flows impact one another frontally there. The downward flow of the lower propeller prevents solid particles from being deposited on the bottom of the reactor. In order to ensure very thorough mixing of the feed solutions and a very homogeneous suspension in the reactor, the vertical arrangements of the 3 propellers relative to one another and to the height of fill of the reactor must be within certain ranges. Below, the heights of the lower, middle and upper propeller above the reactor bottom are designated by (a), (b) and (c) and the height of fill of the reactor by (h). It was found that particularly pressure-resistant and dense nickel hydroxides can be prepared if $0.1 \leq a/h \leq 0.3$ for the lower propeller, $0.4 \leq b/h \leq 0.6$ for the middle propeller and $0.7 \leq c/h \leq 0.9$ for the upper propeller. The ranges of $0.2 \leq a/h \leq 0.3$, $0.4 \leq b/h \leq 0.5$ and $0.7 \leq c/h \leq 0.8$ are particularly preferred. Depending on the specific object, such as, for example, density of the solid particles produced and mean particle diameter the angular velocity and diameter of the propellers can be chosen according to the known rules of technology. Thus, it is entirely possible for the propellers on the 3 different planes to have different diameters.

The particularly pressure-resistant nickel hydroxides according to the invention can be particularly advantageously prepared in the reactor described.

The invention furthermore relates to a reactor for carrying out precipitation reactions, which is characterized in that it comprises a stirrer which has 3 propellers in 3 different horizontal planes on a common shaft and in that one propeller produces a flow in the opposite direction to the other two propellers.

The pulverulent compounds according to the invention are suitable in particular as precursors for the preparation of active materials for lithium secondary batteries.

The invention is furthermore explained by the following examples and comparative examples.

EXAMPLES

The nickel hydroxides prepared in the following examples were investigated with regard to various physical properties, as stated in the examples. Unless noted otherwise, the procedure was as follows:

D10, D50 and D90 values were measured according to ASTM B 822 by means of laser diffraction using a Master-Sizer Sµ from MALVERN, BET (specific surface area) was determined according to ASTM D 3663, tapped density was determined according to ASTM B 527, porosity was determined according to ASTM D 4222.

The preparation of the product according to the invention was effected in the reactor (1) shown in FIG. 1 by precipitation crystallization from aqueous solution. For thoroughly mixing the starting material solutions and achieving a homogeneous suspension, the reactor is equipped with a stirrer (2) with variable speed. Three propellers (4a), (4b) and (4c) are arranged in various planes on a common shaft (3), the propellers (4a) and (4c) producing a downward flow, and an upward flow being produced by propeller (4b).

For establishing a constant temperature, the reactor is equipped with a regulated heat exchanger (5). The reactor is operated continuously by a procedure in which metal sulphate solution is continuously metered in by means of pump (6), ammonia solution by means of pump (7) and sodium hydroxide solution by means of pump (8), and the resulting suspension flows out of the reactor via the free overflow (9). This overflow ensures that the suspension volume is kept steady at 40 liters. Depending on the resulting volume flow of the suspension and hence the average residence time, or waiting time of up to 6 residence times was allowed in the experiments and then the suspension obtained within the next two residence times was collected for further working-up. The working-up was effected by filtration over a suction filter, washing with 2 liters of water, with 2 liters of dilute sodium hydroxide solution (1 g/l) and again with 2 liters of water per kg of product and subsequent drying over the filter cake on metal trays in a drying oven (with hot air) at 80° C. to constant weight.

Example 1

Figure 2:
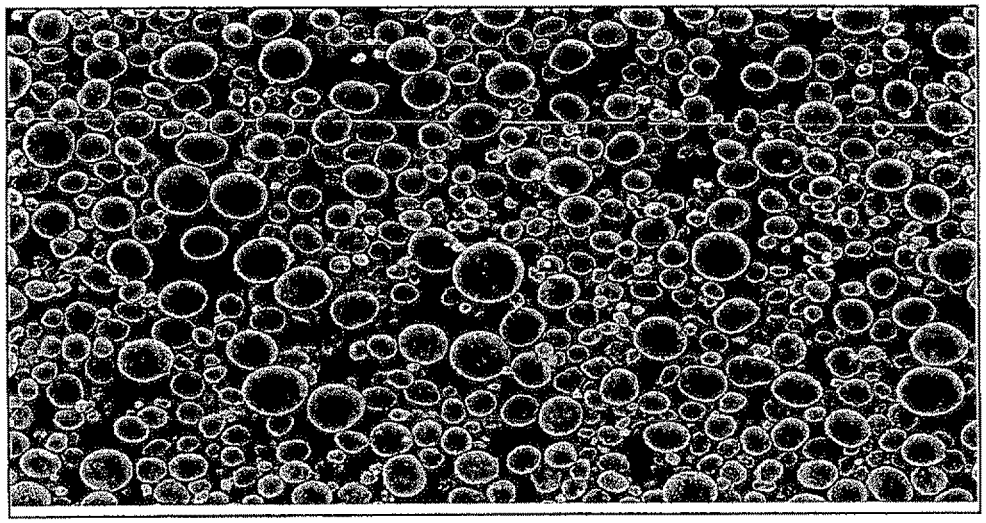
Figure 4:
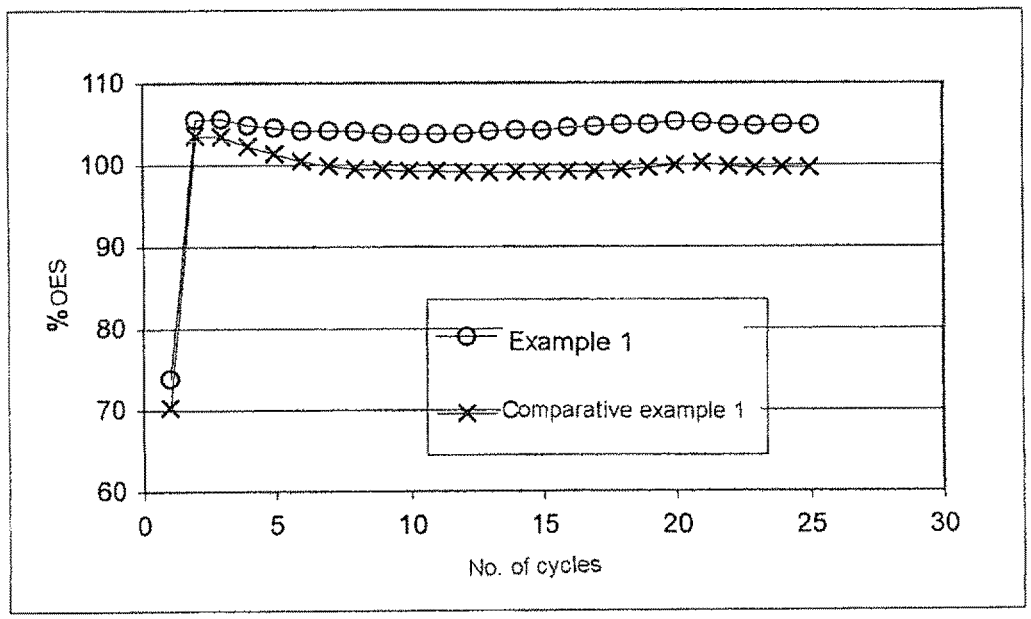

The reactor (1) was operated at a temperature of 50° C. and with a stirrer speed of 600 rpm. 2717 g/h of metal sulphate solution having a concentration of (109.6 g/l of Ni, 2.84 g/l of Co, 7.58 g/l of Zn), 143 g/h of ammonia solution (225 g/l of $NH_3$) and 1621 g/h of sodium hydroxide solution (274.6 g/l of NaOH) were metered in continuously. After the elapse of 50 h, the reactor had reached its steady state and the suspension then running out was collected over 20 h and worked up as described above. 8.01 kg of dry product of the formula $Ni_{0.9192}Co_{0.0238}Zn_{0.0570}O_{0.0101}(OH)_{1.9839}(SO_4)_{0.0031}$ having a residual moisture content of 0.20% were obtained. The physical properties of the product are shown in Table 2. The electrochemical behaviour of the nickel hydroxide in rechargeable nickel metal hydride test cells is shown in FIG. 4. The relative charging capacity (% OES) of the one-electron step (Ni(II)→Ni(III)) is plotted against the number of cycles. FIG. 2 shows a scanning electron micrograph of the product.

Figure 3:
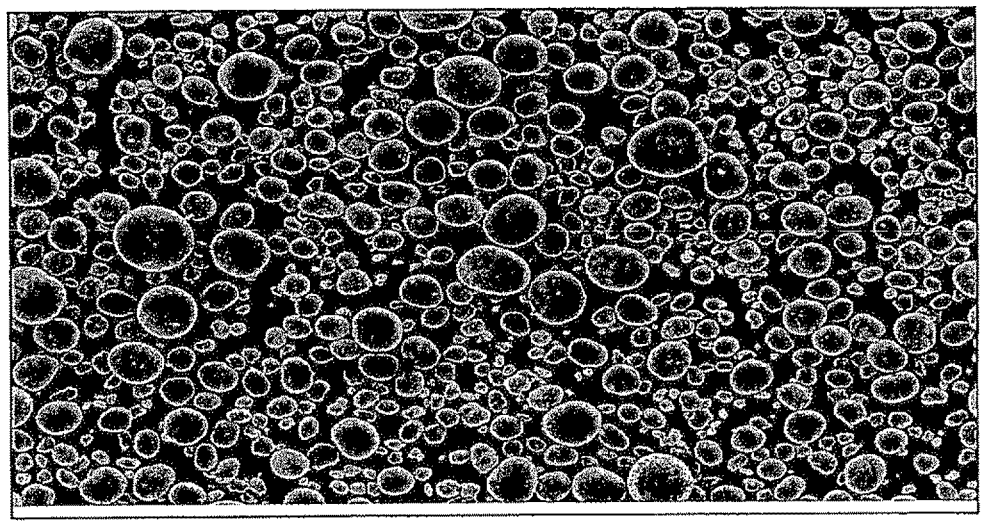

5 g of the material obtained in Example 1 were exposed to a pressure of 50 MPa in a toggling press. The behaviour of the material is likewise shown in Table 2. FIG. 3 shows a scanning electron micrograph after compression.

FIG. 3 shows that the spheroidal secondary particles have substantially retained their shape after the compression and are not broken into fragments of spheroidal particles. This shows that a material bed of the compound presented here withstands a pressure of 50 MPa without the particles being broken.

Comparative Example 1

The experiment was carried out analogously to Example 1, with the only difference that the conventional reactor was used instead of the reactor (1) according to the invention. After the drying, 8.014 kg of product of the formula $Ni_{0.9191}Co_{0.0238}Zn_{0.0571}O_{0.0203}(OH)_{1.9712}(SO_4)_{0.0099}$ having a residual moisture content of 0.22% were obtained. The physical properties of the product are again shown in Table 1. The electrochemical utilization of the one-electron step in an NiMeH test cell is also shown in diagram 1.

It is evident that the drop in the charging capacity after the maximum in the $2^{nd}$ cycle is smaller in the case of the product according to the invention than in the case of that prepared according to the prior art. In addition, the product according to the invention has a somewhat higher charging capacity. Experience shows that these trends measured in test cells continue with the use in batteries where charging and discharging are effected over a few hundred cycles. Furthermore, owing to the higher tapped density and compressed density, the material according to the invention additionally has a higher volume capacity. This means that the advantage of the material according to the invention over the prior art is even greater than shown in FIG. 4. The physical properties of the product are shown in Table 2.

5 g of the material obtained in Comparative example 1 were once again exposed to a pressure of 50 MPa in a toggling press. The behaviour of the material is likewise shown in Table 2. The material has a high compressed density, and particle size distribution of the agglomerates changes only very slightly.

Example 2

The reactor (1) was operated at a temperature of 45° C. and with a stirrer speed of 900 rpm. 1490 g/h of metal sulphate solution having a concentration of (40.81 g/l of Ni, 40.98 g/l of Co, 38.20 g/l of Mn), 95 g/h of an ammonia solution (225 g/h of $NH_3$) and 1010 g/h of sodium hydroxide solution (232.7 g/l of NaOH) were metered in continuously. After the elapse of 90 h, the reactor had reached its steady state and the suspension then running out was collected over 36 h and worked up as described. 8.005 kg of dry product of the formula $Ni_{0.3333}Co_{0.3334}Mn_{0.3333}O_{0.2101}(OH)_{1.7744}(SO_4)_{0.0078}$ having a residual moisture content of 0.25% were obtained. The physical properties of the product are once again shown in Table 2.

5 g of the material obtained in Example 2 were once again exposed to a pressure of 50 MPa in a toggling press. The behaviour of the material is likewise shown in Table 2.

Comparative Example 2

The mixed hydroxyoxysulphate of the metals Ni, Co and Mn was prepared analogously to Example 2, but in a conventional stirred reactor. 7.995 kg of dry product of the formula $Ni_{0.3334}Co_{0.3333}Mn_{0.3333}O_{0.3011}(OH)_{1.6811}(SO_4)_{0.0095}$ having a residual moisture content of 0.26% were obtained. The physical properties of the product are shown in Table 2.

5 g of the material obtained in Comparative Example 2 were once again exposed to a pressure of 50 MPa in a toggling press. The behaviour of the material is likewise shown in Table 2.

With the material, it is not possible to achieve compressed densities as high as those achieved with the nickel hydroxide according to the invention. This is because the comparative material already has a substantially lower tapped density than the material according to the invention which was prepared according to Example 2. This difference is retained on pressing.

$$\frac{D90 - D10}{D50} \tag{1}$$

in which D denotes diameters of the secondary particles, is less than 1.4.

2. The pulverulent compound according to claim 1, having a compressive strength of at least 100 MPa.

3. The pulverulent compound according to claim 1, having a compressive strength of at least 150 MPa.

4. The pulverulent compound according to claim 1, having a porosity of up to 0.05 $cm^3/g$, measured according to ASTM D 4222.

5. The pulverulent compound according to claim 1, having a porosity of up to 0.03 $cm^3/g$, measured according to ASTM D 4222.

6. The pulverulent compound according to claim 1, wherein the secondary particles of the compound have a spheroidal shape.

7. The pulverulent compound according to claim 6, wherein the secondary particles have a shape factor greater than 0.8.

8. The pulverulent compound according to claim 1, wherein the particles have a the D10 value, measured according to ASTM B 822, that changes by not more than 0.5 μm compared with a starting material after compression of the material at a pressure of 50 MPa.

9. The pulverulent compound according to claim 8, having a D90 value, measured according to ASTM B 822, that changes by not more than 1 μm compared with the starting material after compression of the material at a pressure of 50 MPa.

TABLE 2

| | Example 1 | | Comparative Example 1 | | Example 2 | | Comparative Example 2 | |
|---|---|---|---|---|---|---|---|---|
| | Originally | Compressed at 50 MPa | Originally | Compressed at 50 MPa | Originally | Compressed at 50 MPa | Originally | Compressed at 50 MPa |
| $D_{10}$ [μm] | 5.61 | 5.44 | 3.98 | 3.39 | 5.05 | 4.77 | 3.20 | 2.48 |
| $D_{50}$ [μm] | 11.86 | 11.82 | 10.14 | 10.02 | 10.95 | 10.97 | 7.93 | 7.67 |
| $D_{90}$ [μm] | 20.81 | 21.17 | 18.87 | 19.11 | 19.80 | 20.01 | 14.81 | 14.99 |
| BET [$m^2/g$] | 10.17 | | 12.84 | | 11.36 | | 14.05 | |
| Tapped density [$g/cm^3$] | 2.33 | | 2.15 | | 2.08 | | 1.78 | |
| Compressed density [$g/cm^3$] | | 2.64 | | 2.43 | | 2.42 | | 2.15 |
| Porosity [$cm^3/g$] | 0.0232 | | 0.0455 | | 0.0296 | | 0.051 | |

The invention claimed is:

1. A pulverulent compound of the formula;

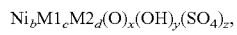

$Ni_bM1_cM2_d(O)_x(OH)_y(SO_4)_z$,

M1 denoting at least one element selected from the group consisting of Fe, Co, Cr, Mg, Cu and mixtures thereof, M2 is Mn and $0.3 \leq b \leq 0.94$, $0.02 \leq c \leq 0.5$, $0 \leq d \leq 0.5$, $0.01 \leq x \leq 0.9$, $1.1 \leq y \leq 1.9$ and $0.001 \leq z \leq 0.03$, wherein secondary particles composed of a multiplicity of primary particles have a compressive strength of at least 50 MPa, and a normalized width of the particle distribution, measured according to the formula (1)

10. The pulverulent compound according to claim 1, having a compressed density of at least 2.4 $g/cm^3$ at a compression pressure of 50 MPa.

11. The pulverulent compound according to claim 1, having a tapped density, measured according to ASTM B 527, of at least 2.0 $g/cm^3$.

12. The pulverulent compound according to claim 11, having a tapped density, measured according to ASTM B 527, of at least 2.3 $g/cm^3$.

13. A secondary lithium battery containing as an active material the pulverulent compound according to claim 1.

14. A nickel metal hydride battery containing as an active material the pulverulent compound according to claim 1.

15. The pulverulent compound according to claim 1, having a normalized width of the particle distribution measure according to the formula (1) is not more than 1.347.

* * * * *